Oct. 15, 1935.  A. SCHMIDT  2,017,475
MACHINE FOR THE GUIDANCE OF TOOLS, AND
MORE PARTICULARLY OF FUSING BURNERS
Filed Oct. 28, 1933   3 Sheets-Sheet 1
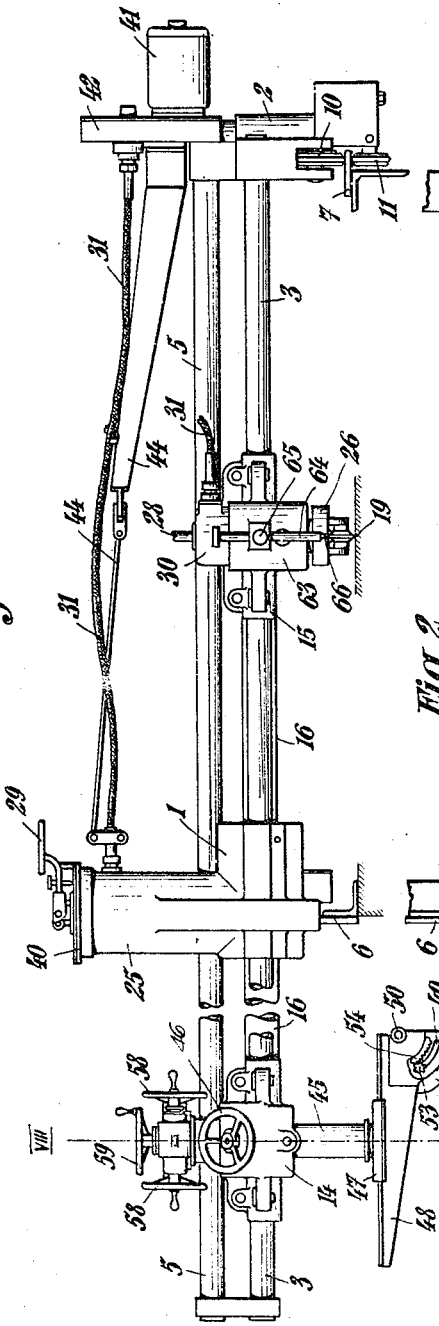

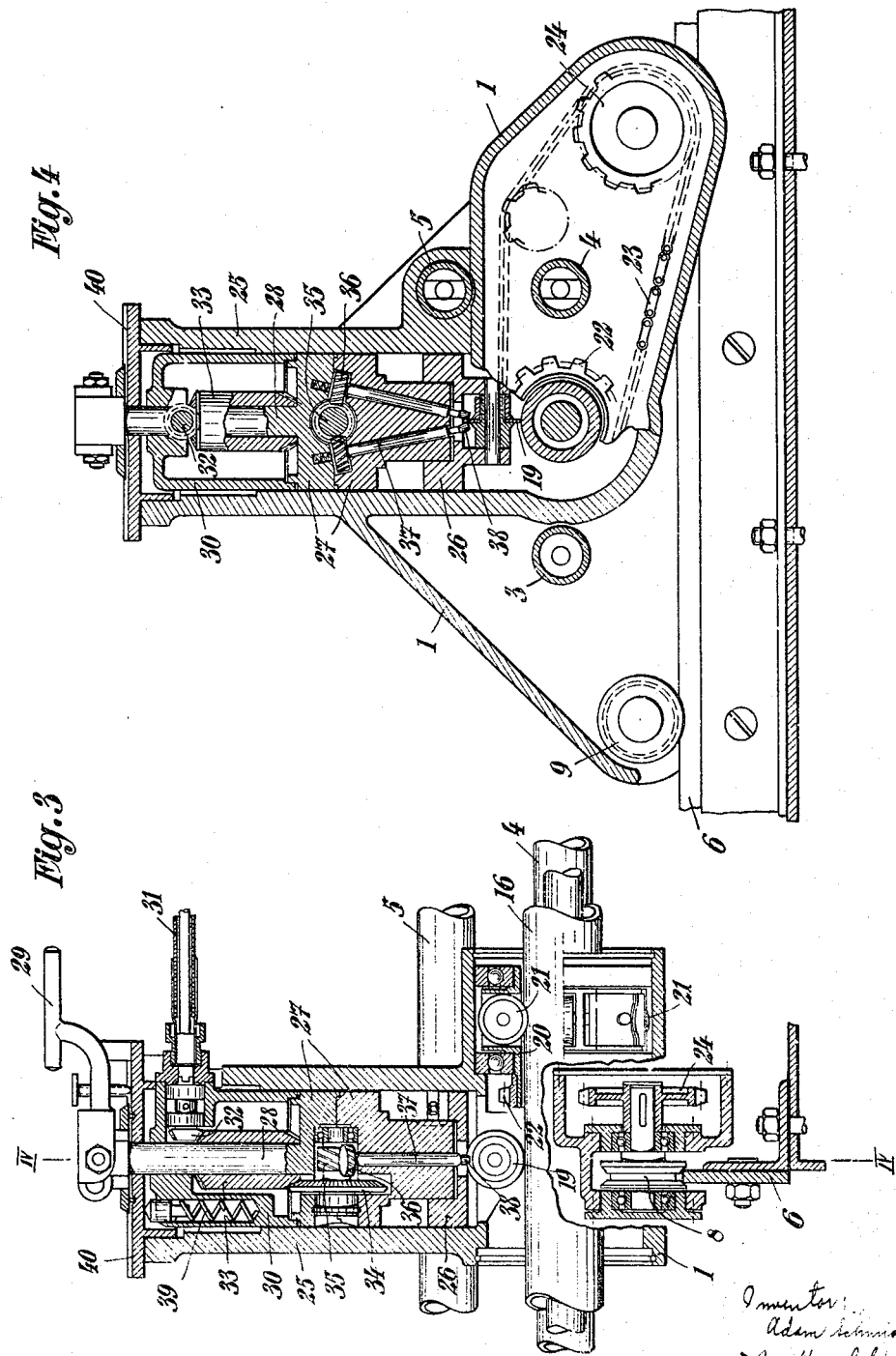

Oct. 15, 1935.  A. SCHMIDT  2,017,475
MACHINE FOR THE GUIDANCE OF TOOLS, AND
MORE PARTICULARLY OF FUSING BURNERS
Filed Oct. 28, 1933  3 Sheets-Sheet 3
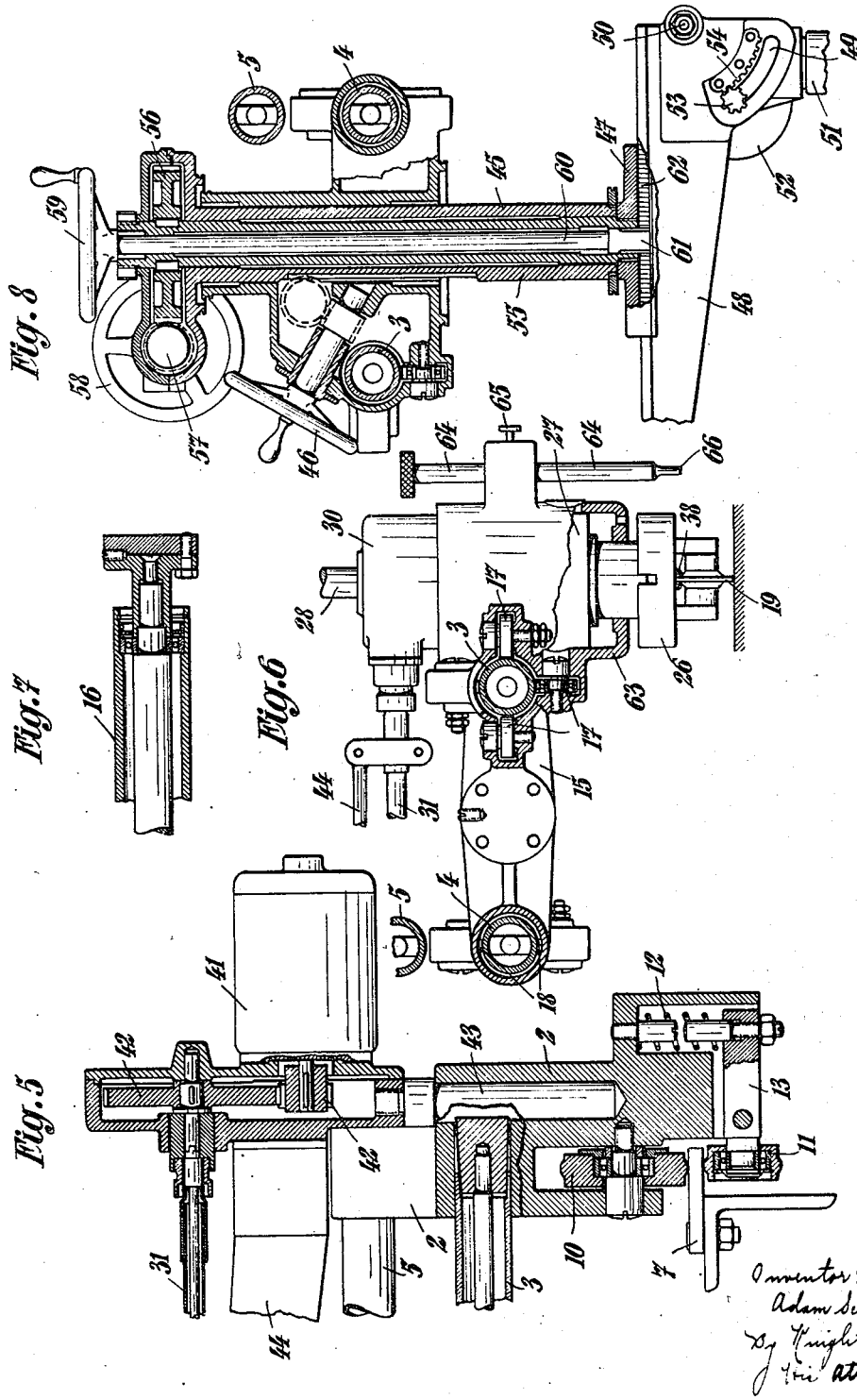

Patented Oct. 15, 1935

2,017,475

UNITED STATES PATENT OFFICE 2,017,475

MACHINE FOR THE GUIDANCE OF TOOLS, AND MORE PARTICULARLY OF FUSING BURNERS

Adam Schmidt, Vienna, Austria

Application October 28, 1933, Serial No. 695,693
In Austria October 31, 1932

13 Claims. (Cl. 266—23)

This invention relates to a machine for the guiding of tools, and more particularly of welding and cutting burners, of the type in which the tool holder and the guiding mechanism are mounted on a carriage running on rails, and has for its object, by improvements in the mounting of the carriage and in the guiding mechanism, to effect a guiding of the tool in a particularly exact and smooth manner, with a minimum of wear on the moving parts of the machine. A further object of the invention is to provide a machine of this nature with which it is possible to work to outlines marked out on the workpiece, or to drawings, or to templets, as desired. The invention further provides a particularly simple type of construction of the gearing employed, which permits of adaptation for either method of working by the mere shifting or exchanging of certain parts.

A form of construction embodying the invention, as used in connection with an autogenous welding and cutting machine, is shown, by way of example, in the accompanying drawings, in which:—

Fig. 1 shows the machine in elevation.

Fig. 2 shows the same in plan view.

Fig. 3 shows the main bearing unit of the carriage, with the driving mechanism shown in section, adapted for cutting to outlines marked out on the workpiece.

Fig. 4 is a section taken on the line IV—IV of Fig. 3.

Fig. 5 shows the second bearing unit of the carriage in part section.

Fig. 6 shows, in part section, the guide head connected in fixed relation to the tool holder.

Fig. 7 shows the connection between the tool holder and the guiding mechanism.

Fig. 8 is a section taken on the line VIII—VIII of Fig. 1, showing the tool holder on a larger scale.

Referring to the drawings, the carriage of the machine consists of bearing units 1, 2, and tubes 3, 4, 5 connecting the same together, and rests by means of running wheels on the rails 6, 7. The running wheels 8, 9 are mounted on the main bearing unit 1, and of these wheels the former is driven by the guiding mechanism. In the bearing unit 2 there are mounted a pair of running wheels 10, 11 which contact with the rail from above and from below, respectively. The running wheel 11 is mounted on an arm 13 stressed by a spring 12, and is constantly pressed against the rail 7. The carriage thus rests at two points upon the rail 6 adjacent the tool holder, and only at one point on the other rail, thus providing three point suspension, ensuring reliable and smooth travel of the carriage. The tubes 3, 4, 5 extend beyond the main bearing unit 1. Upon the projecting portions of the tubes 3 and 4 there is slidably mounted a tool holder 14, in this case a burner carrier. On the portions of the tubes 3 and 4 intermediate the bearing units 1 and 2 there is further slidably mounted a guide head 15. Rotatably mounted in ball bearings on the burner carrier and on the guide head there is a cylinder 16 which connects these two parts together. The carrier 14 of the burner and the guide head 15 are mounted, similarly to the carriage, on the three point suspension principle, on the tubes 3 and 4, the arrangement being that they bear at several points on the tube 3, by means of rollers 17 (Fig. 6) circumferentially distributed, and on the tube 4 by means of a pair of rollers 18 disposed in a vertical plane.

In the main bearing unit 1 there is provided a guide device for cutting to outlines marked out on the workpiece, which functions similarly to that described in my U. S. Patent No. 1,921,887 and shown in Figs. 3, 4, 5, 8, and 9 of this patent specification. As in the previous instance, this device includes a driving wheel 19 which bears against the cylinder 16, which is pivoted about an axis at right angles to its axis of rotation, and which is driven through the intermediary of gearing to be described hereinafter. This driving wheel serves to impart to the cylinder 16, according to its own position at any one time, a rotary, longitudinal, or combined movement. The cylinder transmits the rotary movement to the wheel 8 of the carriage, and the longitudinal movement directly to the carrier of the burner, as described in the specification of my Patent No. 1,921,887. For this purpose the cylinder is mounted in a roller case 20 the rollers 21 of which are provided with concave peripheral surfaces, so that they bear elastically only with their sharply profiled edges on the cylinder, and thus permit of longitudinal movement of the cylinder in the roller case, but not of any relative rotation of the cylinder in the case. The roller case 20 is rotatably mounted on ball bearings in the main bearing unit 1, and carries a chain sprocket wheel 22 which is operatively coupled by a chain 23 to a sprocket wheel 24 pertaining to the drive of the travelling wheel 8.

For the housing of the gearing, the bearing unit 1 is provided with a cylindrical superstructure 25. The gearing takes the form of an independent gearing head adapted for insertion in the superstructure, since it is also required to be capable of being inserted in the guiding head 15 when cutting is to be carried out to drawings or with the aid of templets, and is constructed as follows. On a shoulder of the superstructure 25 there rests a bearing bush or box 26 for the driving wheel 19. The upper portion of this bushing is fitted over the end of a two-piece housing 27, and locked against rotation relatively thereto. The upper part of the housing 27 carries a pin 28 fitted at its upper end with a handle 29 by means of which the housing 27 and with it the driving wheel 19 can be turned or swivelled. Rotatable about the pin 28 there is a hood 30 which rests upon the upper portion of the housing 27, and which embodies the bearing for a bevel gear wheel 32 coupled to a flexible driving shaft 31. This bevel wheel 32 meshes with a sleeve having teeth at both ends, which is mounted on the pin 28, and which is coupled by a large bevel wheel 34 to a spiral gear 35 mounted on a horizontal shaft. This spiral gear engages two spiral gears 36 secured to two symmetrically arranged converging shafts 37. To the lower ends of these shafts 37 there are attached milled rollers 38 which engage the flanks of the driving wheel 19 for the purpose of rotating the latter. In tubular sockets in the hood 30 there are provided helical springs 39 which bear against the cover 40 of the superstructure 25, and which exert a constant downward pressure upon the gearing head. Graduation marks can be provided on the cover to measure swivelling.

For the driving of the wheel 19 a motor 41 together with reduction gearing 42 are rotatably mounted on a pin 43 on the bearing unit 2. From the gearing a flexible shaft 31 takes the drive to the gearing head (bevel wheel 32). The flexible shaft is supported by means of an arrangement of jointed rods 44.

In the burner carrier 14 there is provided a tube 45 which is vertically adjustable by means of gearing controlled by a hand-wheel 46. At the lower end of a tube 55 disposed within the tube 45 there is mounted in a shoe guide 47 a transverse bearing member 48 which is provided at one end with an arcuate setting slot 49 for the burner 51 which is pivotally mounted upon the pin 50, and which is capable of being set to any desired angle of inclination by means of a hand-wheel 52, spur wheel 53, and toothed segment 54, for the purpose of cutting at an angle to the face of the workpiece. To the upper portion of the tube 55 there is attached a worm wheel 56 which can be moved by a worm 57 operated by a hand-wheel 58, for the purpose of guiding the burner for circular cuts, independently of the usual guiding mechanism. Within the tube 55 there is mounted a shaft 60 which can be turned by means of a hand-wheel 59, and which engages with a spur wheel 61 in a rack 62 pertaining to the transverse bearing member 48, for the purpose of enabling the burner to be adjusted radially.

The guide head 15 slidable upon the tubes 3, 4 has a cylindrical casing 63 into which the gearing head unit can be inserted bodily. Before changing over to work with templets, the box 26 with the driving wheel 19 is first detached. In a lug cast on the casing 63 a pin 64 is vertically slidable and adapted to be fixed in position by means of a set-screw 65. This pin terminates at the lower end in a powerful mandrel 66 of a thickness equal to the cutting breadth of the burner. The mode of operation of the machine, when cutting to outline marked out on the workpiece, is as follows. The burner is set to the required distance from the surface of the workpiece by means of the hand-wheel 46, and is started up with the motor running. The motor, acting through the gearing head, rotates the driving wheel 19, the rotary motion being transmitted from the flexible shaft 31 through the bevel gear wheel 32, the toothed sleeve 33, and the large bevel wheel 34 to the spiral gear 35, and thence through the intermediary of the spiral gears 36 and the converging shafts 37 to the rollers 38 which cause the driving wheel 19 to rotate and to roll against the peripheral surface of the cylinder 16. At the same time the driving wheel is so controlled in its setting by the operation of the handle 29 that the burner follows the outline marked out on the workpiece. This positive interconnection between handle and burner is given by virtue of the arrangement that the rolling movement of the driving wheel 19 produces a corresponding movement and/or rotation of the cylinder 16, and thereby a corresponding movement of the carriage, as explained above.

In making difficult cuts, and more particularly cuts having a number of curves it is hardly possible to guide the burner correctly with the aid of the handle 29. In such cases it is advisable to work to a pattern which, for this purpose, is placed in position beneath the pin 64. If the mandrel of this pin be brought up to the peripheral curve of such pattern, and so governed by means of the handle 29 that it bears constantly with slight pressure against the side of the pattern it becomes possible with ease to obtain a perfectly faultless cut. The required pressure of the mandrel against the pattern is attained if the handle be so controlled as if it were intended to cause the mandrel to penetrate thereby obliquely into the material of the pattern.

For the purpose of cutting to a drawing placed beneath the guide head, the gearing head, together with the sleeve 26 carrying the driving wheel 19, is lifted bodily out of the superstructure 25, and inserted in the casing 63, the loop or slack in the flexible shaft thereby produced being securely supported upon the doubled up rods 44. The driving wheel 19 is guided either directly by the handle 29, so as to follow the lines of the drawing, or by causing the mandrel on the pin 64 to follow the lines of the drawing. In the latter case observation is facilitated.

For the purpose of cutting to a templet placed in position beneath the guide head, the gearing head is inserted without the box 26 in the casing 63, so that the milled rollers 38 grasp the templet from both sides. No hand control is in this case required, since the driven rollers 38 travel of their own accord along the templet flange.

As distinct from the known machines, with the machine according to the present invention the weight of the carriage rests essentially upon the rails 6, so that the carriage can be guided without play on the rails 6. In this way any rocking or inaccurate travelling of the carriage is precluded for the outset. The positioning of the centre of gravity thus obtained also permits of the safeguarding of the carriage against becoming lifted from the guide rail 7, which is afforded by the pair of running wheels 10, 11.

The adoption of the three point suspension principle in the mounting of the carriage, as also of the tool carrier and of the guide head, also tends to ensure smooth and uniform movement. The mounting of these parts on the tubes 3 and 4, by means of the rollers 17 and 18, provides the advantage that the rollers, in consequence of the fact that they contact with the tubes only at points, can readily dislodge any dust of oxidation collecting thereon, and thus always have a perfectly clean track. Hitherto the unavoidable collection of dust of oxidation has proved very troublesome, inasmuch as it gave rise to jamming, jerky movement, and rapid wear on the sliding surfaces, with consequent unreliable and faulty guidance of the travelling parts. The advantages derivable from the many uses to which the machine can be put will be clear without further elucidation. The gearing head is notable for its extreme simplicity. Idle movement is reduced to a minimum, which is of particular importance in an autogenous cutting machine. The differential gear commonly employed is avoided, and therefore also the disadvantages shown by experience to be attendant thereon, in consequence of the fact that in sharply curved portions of the templet the one roller, on coming out of engagement with the templet, runs idle and races, while the other roller, and with it the entire mechanism, comes to a standstill. The construction herein described affords faultless guidance, and that in both directions, in spite of its simplicity.

I claim:

1. A machine for the guidance of tools, and more particularly of fusing burners, comprising a carriage supported upon rails, a tool holder carried by said carriage and slidable in a direction transverse to the rails, a cylinder rotatably journaled on said carriage and connected with said tool holder, a driving wheel swivelly mounted on said carriage and adapted to roll on the outer surface of the said cylinder, a handle to adjust the angular position of said driving wheel for guiding said fusing burner along a design on the work piece, a gearing head adapted to drive the said wheel, and a guide head rigidly connected with said tool holder and capable of receiving said gearing head for guiding the tool along a drawing or a template.

2. A machine for the guidance of tools, and more particularly of fusing burners, comprising a carriage supported upon rails, a tool holder carried by said carriage and slidable in a direction transverse to the rails, a cylinder rotatably journaled on said carriage and connected with said tool holder, a driving wheel swivelly mounted on said carriage and adapted to roll on the outer surface of the said cylinder, a handle to adjust the angular position of said driving wheel for guiding said fusing burner along a design on the work piece, a gearing head adapted to drive the said wheel, and a guide head rigidly connected with said tool holder and capable of receiving said gearing head, said gearing head comprising a couple of guiding rollers adapted to travel along templates, and a detachably mounted box comprising a driving wheel.

3. A machine for the guidance of tools, and more particularly of fusing burners, comprising a carriage supported upon rails, parallel tubes supported upon said carriage and extending in a direction transverse to said rails, a tool holder, a guiding head connected with said tool holder, said tool holder and guiding head being carried on said tubes by means of rollers engaging the cylindrical peripheries of said tubes.

4. A machine for the guidance of tools, and more particularly of fusing burners, comprising a carriage supported upon rails, parallel tubes supported upon said carriage and extending in a direction transverse to said rails, a tool holder, a guiding head connected with said tool holder, said tool holder and guiding head each being carried on said tubes by means of rollers engaging the cylindrical peripheries of said tubes and bearing upon said tubes at only three places.

5. A machine for the guidance of tools and more particularly of fusing burners, comprising a carriage supported upon rails, a tool holder slidingly mounted upon two parallel tubes supported upon said carriage and extending in a direction transverse to said rails, said tool holder being mounted on said tubes by means of rollers bearing at only three places, the rollers bearing on one tube at two places being disposed in spaced relation about the circumference of said tube, the rollers bearing on the other tube comprising a single pair disposed in a vertical plane.

6. A machine for the guidance of tools, and more particularly of fusing burners, comprising a carriage, a tool holder and guide head assembly mounted on said carriage, driving mechanism on said guide head comprising a pair of guiding rollers adapted to travel on templates, said rollers being rigidly coupled by means of a driving member common to both.

7. A machine for the guidance of tools, and more particularly of fusing burners, comprising a carriage, a tool holder and guide head assembly mounted on said carriage, driving mechanism on said guide head comprising a pair of guiding rollers adapted to travel on templates, said rollers being directly connected to a common driving member by a self-locking gear of high transmission ratio.

8. A machine for the guidance of tools, and more particularly of fusing burners, comprising a carriage, a tool holder and guide head assembly mounted on said carriage, driving mechanism on said guide head comprising a pair of shafts inclined toward each other, a pair of guiding rollers on the closer ends of said shafts adapted to travel on templates, spiral gears on the more remote ends of said shafts, and means engaging said spiral gears adapted to rotate the same and to impart a longitudinal thrust to said shafts.

9. A machine for the guidance of tools, and more particularly of fusing burners, comprising a carriage, a tool holder and guide head assembly mounted on said carriage, driving mechanism on said guide head comprising a pair of shafts inclined toward each other, a pair of guiding rollers on the closer ends of said shafts adapted to travel on templates, spiral gears on the more remote ends of said shafts, and a single central spiral gear meshing with the said spiral gears and adapted to impart a longitudinal thrust to said shafts.

10. A machine for the guidance of tools, and more particularly of fusing burners, comprising a carriage, a tool holder and guide head assembly mounted on said carriage, driving mechanism on said guide head comprising a pair of guiding rollers adapted to travel on templates, shafts attached to the said rollers, spiral gears on the said shafts, a single central spiral gear meshing with the said spiral gears, a bevel gear rigidly connected to said central spiral gear, and a centrally disposed bevel gear meshing with said first-named bevel gear.

11. In a machine of the class described, a stationary support; a carriage movably mounted thereon; a tool holder and guide head assembly movably mounted on said carriage; a driving gear head; said carriage and guide head each having a casing in which said gear head is interchangeably receivable; said driving gear head comprising means engageable with said stationary support, when said gear head is in said guide head casing, for bodily moving said tool holder by direct thrust against said stationary support; and said driving gear head comprising means engageable with a part of said tool holder and guide head assembly, when said gear head is in said carriage casing, for moving said tool holder by a thrust between said carriage and said tool holder and guide head assembly.

12. A machine as described in claim 11, wherein said means engageable with said stationary support comprise a pair of wheels adapted to embrace a template, said means engageable with a part of said tool holder and guide head assembly comprising a friction wheel; and means for mounting the same between said pair of wheels so that the latter engage and drive said friction wheel.

13. In a machine of the class described, a stationary support; a carriage movably mounted thereon; a tool holder and a guide head assembly movably mounted on said carriage; a driving gear head; said carriage and guide head each having a casing in which said gear head is interchangeably receivable; said driving gear head comprising means engageable with said stationary support, when said gear head is in said guide head casing, for bodily moving said tool holder by direct thrust against said stationary support; and said driving gear head comprising means engageable with a part of said tool holder and guide head assembly, when said gear head is in said carriage casing, for moving said tool holder by a thrust between said carriage and said tool holder and guide head assembly; the part of said tool holder and guide head assembly engaged by said driving gear head being rotatable; and driving connections between said part and said carriage, actuated by rotation of said part, whereby said carriage is moved on said stationary support.

ADAM SCHMIDT.